United States Patent [19]

Scholl

[11] Patent Number: 4,877,186
[45] Date of Patent: Oct. 31, 1989

[54] WINDSHIELD WASHING SYSTEM, ESPECIALLY FOR MOTOR VEHICLES

[75] Inventor: Wolfgang Scholl, Gemmrigheim, Fed. Rep. of Germany

[73] Assignee: ITT SWF Auto-Electric GmbH, Bietigheim-Bissingen, Fed. Rep. of Germany

[21] Appl. No.: 230,831

[22] PCT Filed: Nov. 4, 1987

[86] PCT No.: PCT/EP87/00667
§ 371 Date: Jun. 30, 1988
§ 102(e) Date: Jun. 30, 1988

[87] PCT Pub. No.: WO88/03488
PCT Pub. Date: May 19, 1988

[30] Foreign Application Priority Data

Nov. 7, 1986 [DE] Fed. Rep. of Germany ....... 3638074

[51] Int. Cl.$^4$ ........................... B05B 12/10; B60S 1/46
[52] U.S. Cl. .................................. 239/75; 15/250.01; 239/124; 239/284.1
[58] Field of Search ................... 239/284.1, 284.2, 75, 239/124, 125, 126, 127; 15/250.01, 250.02, 250.03, 250.04

[56] References Cited

U.S. PATENT DOCUMENTS

| | | | |
|---|---|---|---|
| 2,576,198 | 11/1951 | Stuart | 239/284.1 |
| 2,914,256 | 11/1959 | O'Shei | 239/284.1 |
| 3,516,610 | 6/1970 | Stevens | 239/284.1 |
| 3,901,444 | 8/1975 | Maltbie et al. | 239/284.1 |

FOREIGN PATENT DOCUMENTS

| | | | |
|---|---|---|---|
| 1810798 | 9/1970 | Fed. Rep. of Germany | 15/250.01 |
| 2431739 | 1/1976 | Fed. Rep. of Germany | 239/284.1 |
| 3634406 | 11/1987 | Fed. Rep. of Germany | 15/250.01 |
| 63372 | 9/1955 | France | 239/284.1 |
| 2377911 | 9/1978 | France | 239/284.2 |
| 1576098 | 10/1980 | United Kingdom | 15/250.01 |

Primary Examiner—Andres Kashnikow
Assistant Examiner—Michael J. Forman
Attorney, Agent, or Firm—Robert P. Seitter

[57] ABSTRACT

A windshield washing system for motor vehicles is described in which a non-return valve is installed into the feed pipe, which non-return valve, for ensuring a quick response from the washing system, prevents the feed pipe from emptying, while the pump is switched off. According to the invention a bypass switchable via a valve runs parallelly to this non-return valve, which bypass is opened in winter, i.e. in low outdoor temperatures, but is closed in summer. Consequently during winter mode of operation the feed pipe is emptied. Thus the washing liquid is prevented from freezing.

6 Claims, 1 Drawing Sheet

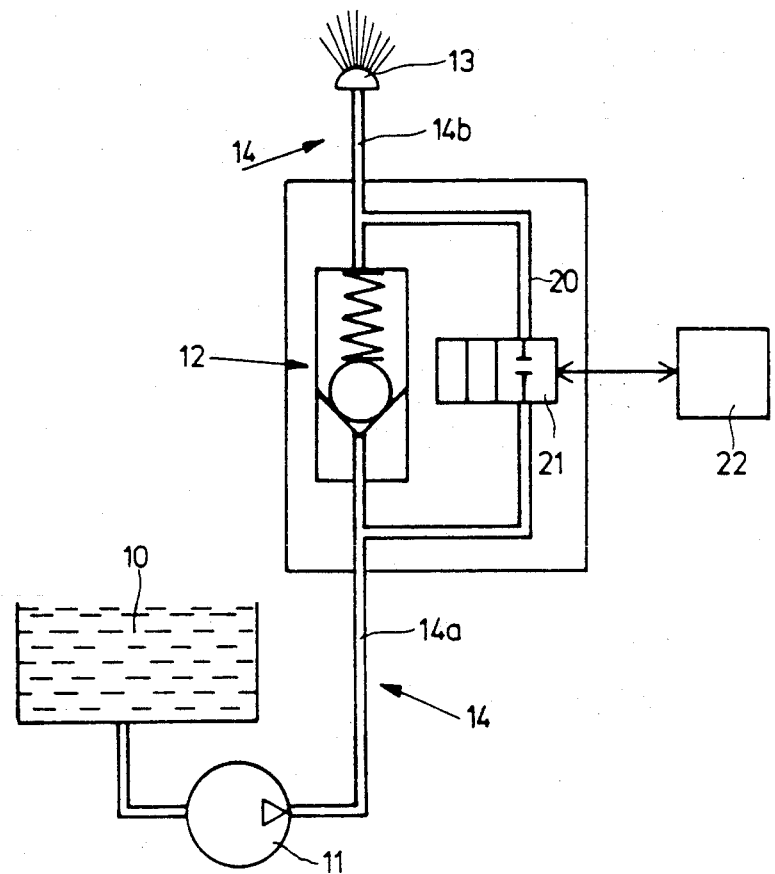

WINDSHIELD WASHING SYSTEM, ESPECIALLY FOR MOTOR VEHICLES

Normally a windshield washing system for motor vehicles comprises a washing liquid reservoir from which the washing liquid is supplied to at least one jet in a feed pipe via a pump driven by an electric motor. In most cases an impeller pump is used and a non-return valve is installed into the feed pipe so that after the pump being switched off the washing liquid is prevented from flowing back into the feed pipe. Thus it is ensured that very little time passes between switching on the pump and the washing liquid issuing from the jet, i.e. it ensures a quick response from the washing system.

As to these washing systems in which, for ensuring a quick response, the feed pipe is not emptied, it is of a disadvantage however, that particularly in the portion next to the jet the anti-freeze liquid mostly added to the washing liquid evaporates and that therefore, without taking additional measures, it cannot be relied on that the washing liquid is prevented from freezing. Therefore heated jets have been used. However, thus the costs of production essentially increase and the installation becomes much more difficult.

Therefore the object of the present invention is to improve operational security of such a windshield washing system by easiest means.

Thus the invention is based on the idea that, so to speak, the operational security can be improved by changing the mode of operation of the windshield washing system. According to the present invention it is provided that in summer the washing system is operated as usual, i.e. with a feed pipe not emptied, whereas in winter, i.e. in low outdoor temperatures, a mode of operation with an emptied feed pipe is chosen. Thus in many cases the washing liquid can be prevented from freezing, but it has to be taken into consideration that during winter operation it takes more time to respond by the measures according to the invention. However, this prolongation of time does not affect traffic security in the same way as a washing system that is totally ineffective would do.

In the simplest embodiment both modes of operation can be given via an arbitrarily actuable switching element, but an embodiment is preferred, in which this switching element automatically switches over in dependence of the outdoor temperature and thus predetermines the mode of operation of the washing system.

As to a washing system comprising a non-return valve in the feed pipe it can easily be guaranteed that the portion of the feed pipe between the non-return valve and the jet is emptied by providing a branch there, which branch is opened or, in case of higher temperatures, is closed via a valve. As to the simplest embodiment in this portion of the feed pipe washing liquid could thereby flow outside via the valve. However, in order not to lose this amount of washing liquid, according to an especially preferred development of the invention it is suggested that the branch switchable via the valve shall be led back to the portion of the feed pipe between the pump and the non-return valve. Thus, so to speak, a switchable bypass to the non-return valve is provided, which bypass in low outdoor temperatures makes sure that the portions of the feed pipe in front of and behind the non-return valve are connected, but that in high outdoor temperatures this connection is cut.

There are also washing systems, in which—without a non-return valve—the feed pipe is prevented from emptying simply because of the special construction of the pump. In such an embodiment, for the purpose of solving the problem described at the beginning, the direction of rotation of the pump could be changed during winter operation and thus the washing liquid could be drawn back of the feed pipe into the reservoir. Thereby it is of importance that one of the modes of operation are given via a switching element, whereby during summer operation a quick response of the washing system is guaranteed. The invention is described below by means of the embodiment schematically illustrated in the drawing.

The washing system comprises a liquid reservoir 10, a supply pump mostly driven by an electric motor 11, a non-return valve 12, a washing jet 13 as well as a feed pipe 14 with a first portion 14a between the pump 11 and the non-return valve and a second portion 14b between the non-return valve 12 and the washing jet 13. Insofar the washing system corresponds to known embodiments. A branch 20 goes off the portion 14b of the feed pipe between the non-return valve 12 and the washing jet 13, which branch 20 leads to the other portion 14a of the feed pipe. In this branch a switchable valve 21 is installed, which valve 21 opens this branch in one switching position and closes it in the other switching position. The switching position of this valve 21 depends on the switching position of a switching element designated by 22 and schematically illustrated. In the simplest case this could be a switch arbitrarily actuable by hand for controlling the valve. However, an embodiment is preferred in which this switching element 22 works in dependence of the temperature. For this purpose, for instance a bimetal element or an element of an especially expanding material could be used, which immediately mechanically acts upon the valve 21. Of course solutions comprising an electric temperature sensor are also possible, which temperature sensor controls an evaluation circuit via a magnetic valve.

In dependence of the switching position of this switching element 22 and thus of the valve 21 two modes of operation are possible. In higher temperatures, for example above 5° C., the valve 21 occupies the position shown, in which the connection between the two portions 14a and 14b of the feed pipe via the branch 20 is interrupted. As to this mode of operation set in summer the feed pipe 14—after the pump being switched off—is consequently prevented from emptying by means of the non-return valve 12. In case of low outdoor temperatures, however, the branch 20 is opened via the valve so that after the pump being switched off the washing liquid can flow from the portion 14b adjacent to the washing jet 13 via the bybass 20 into the portion 14a and from there back into the reservoir 10. Thus as to this winter mode of operation the feed pipe 14 is totally emptied in the illustrated embodiment so that in this section the washing liquid is also effectively prevented from getting frozen. However, it has to be accepted that it will take the following washing process more time to respond.

In the drawing only the main idea of the invention is illustrated. For realizing the proposal according to the invention the valve 21 switching the branch 20 and the non-return valve 12, if necessary also the switching element, is preferably combined in one unit, which then can be installed into motor vehicles already in service instead of the previous non-return valve. If a thermomechanical switching element is used, it can be retrofitted without any problems because there is no need at all of laying any additional cables. With respect to motor vehicles already equipped with an electrical temperature sensor and a corresponding evaluation circuit probably a solution comprising a valve electromagnetically actuable in the branch will be preferred. By means of such a unit that can easily be retrofitted it is simple to improve operational security of the washing system at low costs. For instead of several heatable washing jets there is only one single switchable valve which, at any rate does not necessarily require cabling.

What is claimed is:

1. In a windshield washing system, especially for motor vehicles, comprising a feed pipe connected at one end to at least one washing jet, and intermediately operable pump means connected to the other end of said feed pipe for pumping washing fluid through said pipe to said jet upon operation of said pump means and for maintaining washing fluid in said pipe between successive operations of said pump means; the improvement comprising control means selectively positionable in either of a first or a second position, said control means being operable in said first position to drain fluid from at least that portion of said feed pipe adjacent said one end and being operable in its second position to prevent drainage of fluid from said portion of said feed pipe.

2. A windshield washing system according to claim 1 wherein in dependence on the position of control means the direction of rotation of the supply pump is reversible and that in said second position of said control means the washing liquid is drained by means of the pump.

3. The invention defined in claim 1 wherein said control means comprises ambient temperature responsive means for locating said control means in said first position when the ambient temperature is below a selected temperature and for locating said control means in said second position when the ambient temperature is above said selected temperature.

4. The invention defined in claim 1 wherein said pump means includes a non-return valve in said feed pipe at a first location between said one and said other ends of said pipe, and said control means include a conduit having an inlet connected to said feed pipe at a second location between said first location and said one end of said pipe.

5. A windshield washing system according to claim 4 wherein the non-return valve the said control means are combined in one unit.

6. The invention defined in claim 4 wherein said conduit includes an outlet connected to said feed pipe at a third location between said first location and said other end of said feed pipe.

* * * * *